UNITED STATES PATENT OFFICE.

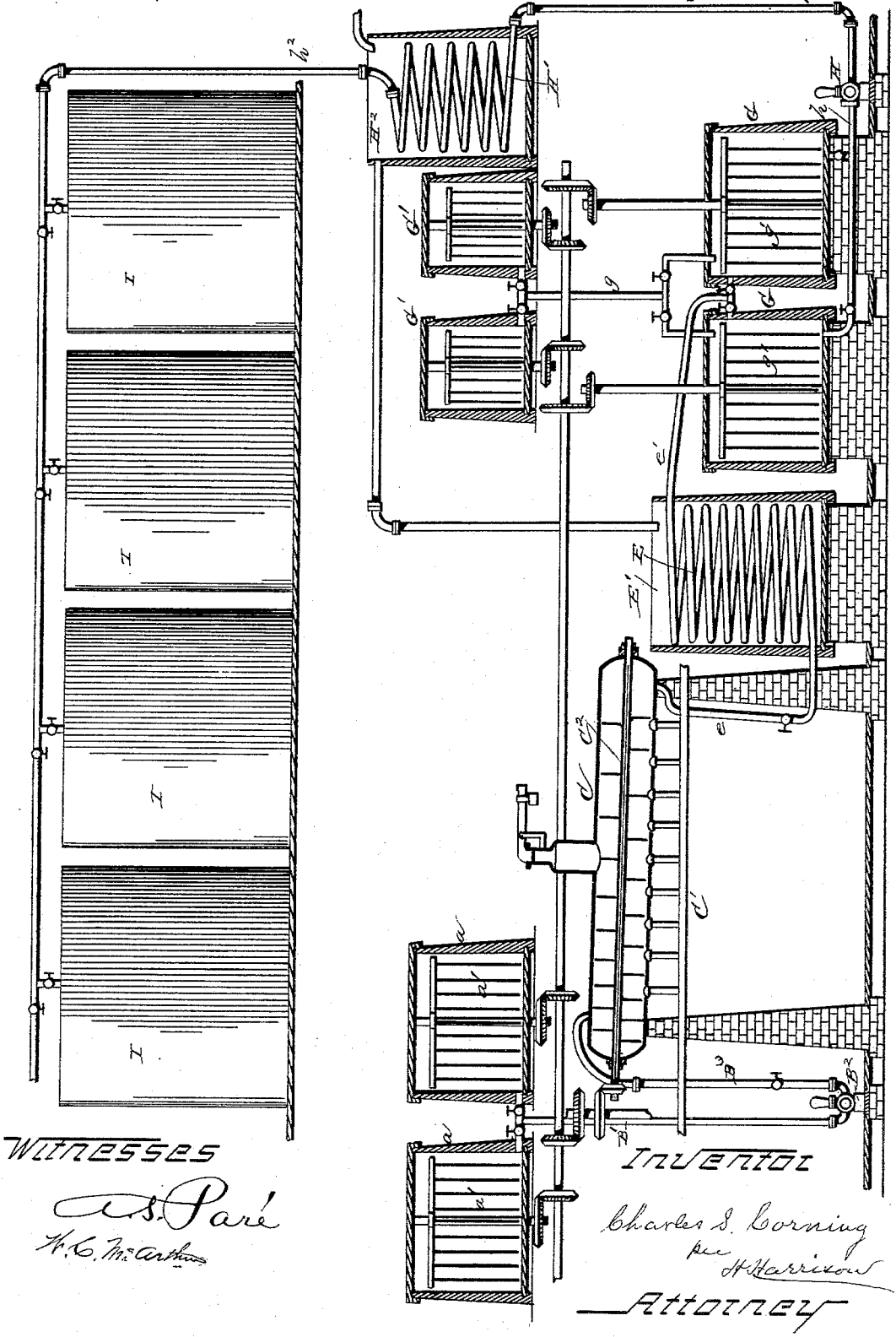

CHARLES S. CORNING, OF PEORIA, ILLINOIS.

PROCESS OF MAKING WHISKY.

SPECIFICATION forming part of Letters Patent No. 325,322, dated September 1, 1885.

Application filed January 20, 1885. (No model.)

*To all whom it may concern:*

Be it known that I, CHARLES S. CORNING, a citizen of the United States, residing at Peoria, in the State of Illinois, have invented certain new and useful Improvements in Process of Making Whisky, of which the following is a specification, to wit:

This invention relates to the manufacture of spirituous liquors; and it consists in certain improvements in the process of mashing the grain for the purpose, substantially as will be hereinafter more fully described and claimed.

In order to enable others skilled in the art to which my invention appertains to avail themselves of its benefits, I will now proceed to describe its operation.

The accompanying drawing represents a diagram section of one form of apparatus suitable for carrying my process into effect, and by reference to which it will be better understood.

In this drawing, $a\ a$ represent a pair of mixing-tubs, each having a suitable stirring or agitating device, $a'$, which is operated from a main driving-shaft, B, receiving power from any suitable engine or motor. These two mixing-tubs are open at the top and are connected by a pipe, B', with a pump, B$^2$, which in turn communicates by a pipe, B$^3$, with a scalding-vessel, C. This vessel is entirely closed to the surrounding atmosphere, and is provided with steam-connections C', which keep a high pressure and temperature constantly on the scalder. From the rear end of said scalder a pipe, $e$, connects with a worm, E, placed in a water-receptacle, E', through which a constant flow of water is passed to cool the mash. While I have represented a worm in this connection, it is evident that any cooling device which will effect the purpose without exposing the mash to contact with the air will serve the purpose equally well, and I shall use any of the many well-known forms that are found most desirable. From this cooling device a pipe, $e'$, connects with two converting-tubs, G, which are covered to prevent the outer air from coming in contact with the contents. The small grain or malt tubs G' are situated above the converting-tubs, and connect with the same by a pipe, $g$, by which the malt or small grain is conveyed to these tubs, where it is thoroughly mixed with the partially-cooled mash by means of stirrers $g'$, also operated from the main driving-shaft, as shown in the drawing. A force-pump, H, draws the converted mash from the tubs G by a pipe, $h$, and forces it through a pipe, $h'$, to a worm or other cooling device, H', in a water-receptacle, H$^2$, and thence by a pipe, $h^2$, to any one of a series of fermenting-tubs, I.

In the process of manufacture, the water, slop, or other liquid is placed in the mixing-tubs in a heated state, and a sufficient quantity of grain added to form a mixture, which is readily pumped into the scalder. The use of hot liquid at this stage of the process serves not only to aid in preventing the settling of the meal or other grain and hold it in suspension, but also heats the grain to a point which greatly facilitates its proper treatment in the scalder. These mixing-tubs are open at the top and the contents exposed to the air. The meal, water, slop, or other liquid are all placed in the tubs and heat applied; or they may be heated separately and mixed together in a heated state in said open tubs. By mixing the meal, water, and slop or other liquid in an open vessel I obtain important results and a more satisfactory and better yield. On being pumped from the mixing-tubs into the scalder, the mixture is instantly subjected to a high degree of heat and pressure, and the process of scalding at once begins. The mixture, entering the scalder at one end, is constantly stirred and agitated by a revolving stirrer, C$^2$, and is slowly fed toward the opposite end.

In the drawing this is effected in a continuous stream without intermission by making each of the stirring-arms as sections of a screw-thread, or by allowing the steam-pressure within the vessel to force the material through from the inlet to the outlet. When the operation is once started, the mixture from the open vessel will flow through the scalder in an uninterrupted and continuous constant stream, and not dependent upon time or other mechanism to be operated intermittently or at intervals, as in some other devices.

By thus passing the material through the scalder in a constant stream I make the process continuous, save greatly in time, and obtain a quick and even scald, which raises the quality of the product and makes it all of the same quality, while a great saving in steam is effected by rendering it unnecessary to blow off the steam after a quantity of material has been scalded. When arriving at the rear end of the vessel, the material is properly scalded, and the steam-pressure forces it continuously through the cooling device E into the converting-tubs, where the malt or small grain is added in the usual way.

It will be observed that when leaving the scalding-vessel the mash is cooled by passing through a closed cooler, thus delivering it to the converters properly cooled, but without having been exposed to the air or the use of expensive vacuum-pumps and their attendant appliances. From the converting-tubs the material is pumped through the cooler H' to any one of the fermenting-tubs.

It will be seen that the mixing-tubs and converting-tubs are used in pairs, and connected to the mash-pipes by connections provided with suitable valves, in order that the material may be mixed in one tub of each pair, while the other is in direct connection with the apparatus, and in this way the process is made continuous, and an unbroken stream of material is passed through the scalder in a thin stream, while the scalding, cooling, converting, &c., being all done in closed or covered vessels connected in a series, the mash is not allowed to come in contact with the air.

While I have herein described the use of grain in the process, I do not desire to confine myself thereto, but will use potatoes or any of the articles well known to distillers and commonly used in the manufacture of liquors.

I have shown and described a pair of mixing-tubs connected to the scalder and a pair of converters, and I prefer to thus use them; but it is evident that my process can be carried out by using a single vessel instead of the pair.

In a separate application of same date with this application I have shown, described, and claimed a special apparatus to carry out this process.

I am aware that heretofore mash-preparing apparatus has been provided having the combination, with a heating and mixing cylinder, of a conduit connecting them, an automatic valve mechanism operated by a diaphragm located in the heating-cylinder to open and close communication between it and the mixing-cylinder, and that in said apparatus is a pump with double plungers to force the material from a closed mixing-vessel into a heating-cylinder, and I do not claim this construction.

Having thus fully described my invention, what I claim as new, and desire to secure by Letters Patent, is—

1. The process of making spirituous liquors, which consists, first, in mixing the grain with water, slop, or other liquid in a heated state or subject to heat in an open vessel, then forcing it into and through, continuously, a closed vessel, where it is subjected to a high degree of heat and pressure, and through a cooling device to the converters, where the small grain is added, and, finally, passing from the converters through a second cooling device to the fermenting-tubs, substantially as shown and described.

2. The process of making spirituous liquors, consisting of preparing the mash and converting in one tub of each pair while the others are in use, and passing the material in a continuous flow through the apparatus, substantially as shown and described.

3. The process of making spirituous liquors, which consists in mixing the grain with water, slop, or other liquid in a pair of mixing-tubs having a single outlet-pipe connected to a scalder, forcing said mixture continuously into and through the scalder, subject to heat and pressure, and through a cooling device into a pair of converters provided with valves to control the flow, and then passing the small grain from one or more grain-tubs into the converters, and then forcing the material from the converters through a cooling device into the fermenting-tubs, substantially as shown and described.

In testimony whereof I affix my signature in presence of two witnesses.

CHARLES S. CORNING.

Witnesses:
 GEO. J. GIBSON,
 W. C. MCARTHUR.